March 14, 1961 W. MINOWITZ ET AL 2,975,288
ION CHAMBER AND CIRCUIT THEREFOR
Filed March 11, 1958 2 Sheets-Sheet 1

INVENTORS
JOHN F GRIMM
WILBERT MINOWITZ
BY
*Eyre, Mann & Lucas*
ATTORNEYS

March 14, 1961 W. MINOWITZ ET AL 2,975,288
ION CHAMBER AND CIRCUIT THEREFOR
Filed March 11, 1958 2 Sheets-Sheet 2

INVENTORS
JOHN F. GRIMM
WILBERT MINOWITZ
BY
Eyre, Mann & Lucas
ATTORNEYS

United States Patent Office 2,975,288
Patented Mar. 14, 1961

2,975,288

ION CHAMBER AND CIRCUIT THEREFOR

Wilbert Minowitz, New York, N.Y., and John F. Grimm, Newark, N.J., assignors to Tung-Sol Electric Inc., a corporation of Delaware Filed Mar. 11, 1958, Ser. No. 720,572

10 Claims. (Cl. 250—83.6)

This invention relates to an ion chamber and its associated measuring circuit which can be used for detecting and measuring gamma and X-ray radiation. It has particular reference to a chamber and circuit which has a wide range of sensitivity and includes a means for instant calibration in the field.

Many forms of portable devices for detecting and measuring penetrating radiation have been designed. In order to obtain the required sensitivity some form of direct current amplifier must be employed and this necessarily includes portable sources of potential, such as dry batteries, which vary considerably in potential during their useful life. The present invention employs a calibration device positioned within an ionization chamber with switching means for connecting its terminals to the amplifying circuit and making the proper adjustments to insure correct calibration. The present invention, also employs the same switching means to vary the sensitivity over a wide range of values.

One of the objects of this invention is to provide an improved ion chamber and circuit which avoids one or more of the disadvantages and limitations of prior art arrangements.

Another object of the invention is to provide an ion chamber and circuit which is portable and may be easily carried in the hand while making field surveys.

Another object of the invention is to provide an ion chamber and circuit which has a wide range of sensitivity.

Another object of the invention is to increase the accuracy of measurement by including a calibration means within the ion chamber.

Another object of the invention is to employ a switching means for a plurality of measurement ranges using a single high input resistor.

Another object of the invention is to check the gastight condition of the ion chamber envelope by including a calibration tube within the chamber exposed to the same gas.

Another object of the invention is to reduce secondary electron emission within the chamber by employing materials having low atomic numbers.

The invention includes an ion chamber for detection of gamma and X-ray radiation. Associated with the ion chamber is an amplifying circuit having an input circuit connected to an input resistor and an output circuit connected to an indicating device which may be a sensitive microammeter. A switching means is connected between the ion chamber and the input resistor for varying the sensitivity of the combination and for switching the calibrating means into the circuit.

For a better understanding of the present invention, together with other and further objects thereof, reference is made to the following description taken in connection with the accompanying drawings.

Figure 1:
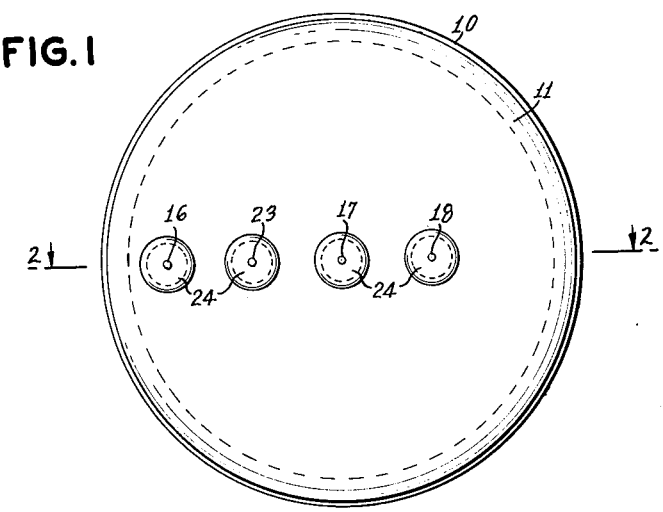
Fig. 1 is a bottom view of the ion chamber showing four lead-in conductors.
Figure 2:
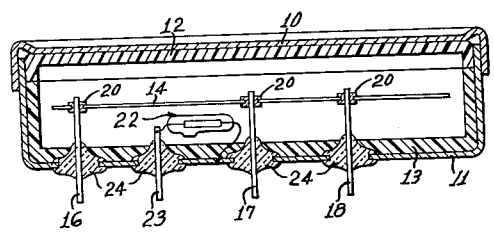
Fig. 2 is a cross sectional view of the ion chamber shown in Fig. 1 which is taken along line 2—2 of Fig. 1.

Referring now to the drawings, the ion chamber is enclosed in a sealed container which includes an upper metallic covering 10, preferably of aluminum and a lower metallic can 11, also preferably of aluminum. Within the chamber a plastic conductive liner 12, 13, is positioned so that it completely covers the inside surface of the chamber. The conductive liner is made of a plastic with interspersed finely divided particles of electrically conductive material, the combination having an effective atomic number of about 7. The plastic conductive liner is preferably formed of a resinous condensation product of formaldehyde with phenol and made conductive by admixture therewith, during molding, of finely divided carbon.

A thin flat disc 14 is mounted within the ion chamber in a generally central position and is separated from the conducting liner 12, 13. The disc is made up of a body of plastic material and is coated on both sides with a conductive coating 15 which may comprise a finely divided carbon held together by a binder. The disc is mounted in its central position by means of three lead-in conductors 16, 17 and 18, which are soldered or welded to small eyelets 20 secured to the disc 14 and make conductive connection with the coating 15. The disc 14 is divided into three conductive areas which may be in the ratio of 1 to 10 to 100. The disc is first coated with conductive coating 15 and then the areas are separated by cutting circular grooves 21 in both upper and lower surfaces to scrape away the coating and isolate the areas.

Also, within the chamber a constant current discharge diode 22 is mounted, one electrode of which is connected to the metal portion 11 of the chamber with the other electrode connected to a lead-in conductor 23. Each of the conductors 16, 17, 18 and 23, is insulated from the metal portion of the chamber by sealed insulators 24.

Figures 3, 4:
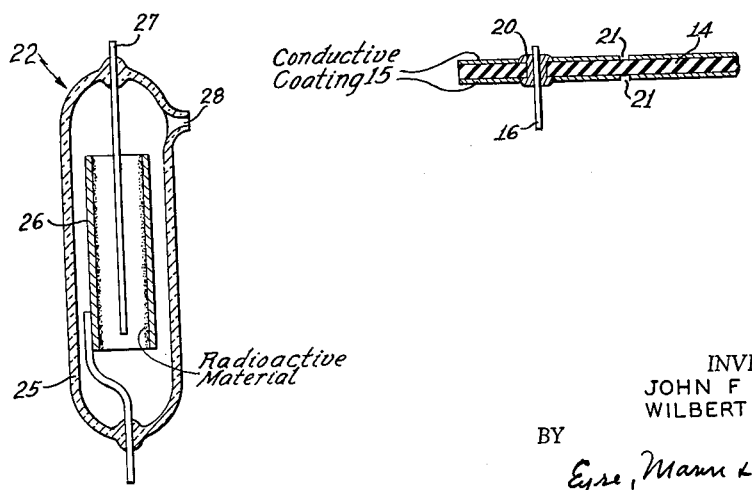
Fig. 3 is a detailed cross sectional view to a large scale of a portion of the central disc showing how connection is made to the conductive coatings.
Fig. 4 is a cross sectional view of the constant current diode used as a calibration device within the ion chamber.

The constant current discharge device is shown in detail in Fig. 4 and includes a glass envelope 25 which incloses two electrodes, one of which may be a cylinder 26 and the other a rod 27. The inside of the cylinder 26 contains a deposit of radioactive material which may be radium bromide. This radioactive material ionizes the air or other gas within the envelope 25 and provides a conductive path between the two electrodes. At all voltages above 20 volts the current is saturated and there will be no change in current for values of voltage between 20 and 200. The constant current characteristic of such a device is used to calibrate the measuring circuit as will be explained later. Such a device is generally sealed against the ambient atmosphere but in this application, since it is inclosed in an air-tight chamber, a vent 28 is formed in the envelope 25 so that the pressure within the chamber 10, 11, and the envelope 25 is always the same. If the seal of the ion chamber envelope should be broken and the pressure within the chamber altered, the calibration device will then indicate an abnormal condition by requiring a different setting of resistor 41 to achieve the desired reading. In this manner the calibration device acts as a warning means for a leaky chamber envelope.

Figure 5:
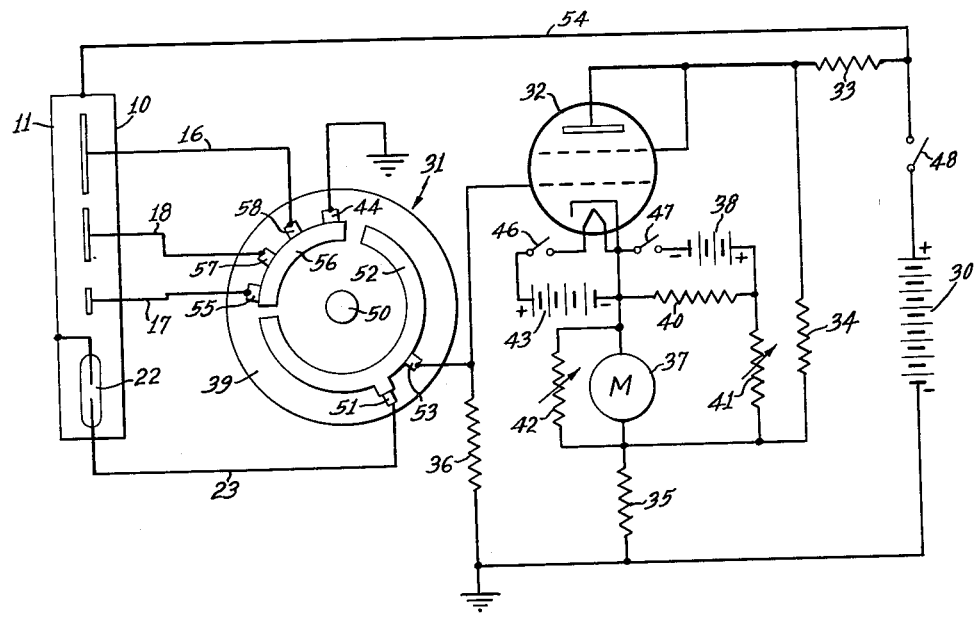
Fig. 5 is a schematic diagram of connections of the ion chamber and circuit.
Figure 6:
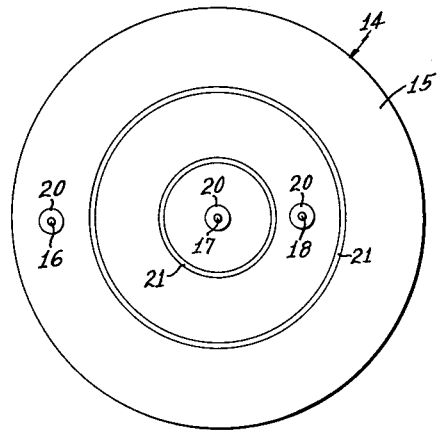
Fig. 6 is a plan view of the central disc used in the ion chamber.

The circuit and switching means is shown in Fig. 5 where the chamber metal case is shown connected to the positive terminal of a source of potential 30 and the three areas on the disc are connected by conductors 16, 17 and 18, to switch terminals which are part of a switching means 31. The constant current device 22 is also connected to a switch terminal by conductor 23.

The amplifier means which picks up a signal from the ion chamber and applies it to a measuring device may be any of the usual amplifying circuits, the one shown in Fig. 5 being illustrative of one particular form. This form includes a vacuum tube 32 having an anode, cathode, and a control electrode. Voltages for the three electrodes are obtained from the source of potential 30 and a voltage divider which includes resistors 33, 34 and 35, these three resistors being connected in series with the end terminals connected across the source of potential. The control electrode in amplifier tube 32 is connected in series with an input resistor 36 to the negative terminal of the source of potential which may be grounded. The control electrode is given a negative bias potential by means of the voltage divider in order to reduce the anode-cathode current. The indicating device may be a meter 37 which is connected in series with resistor 35 between the cathode and ground. In order to calibrate the meter and adjust the zero reading, an additional source of potential 38 is employed in connection with a shunt resistor 40, a variable series resistor 41, and a second shunt resistor 42. The vacuum tube cathode is heated by another source of potential 43.

The switching device 31 have five positions. The first position grounds the control electrode and is obtained when the insulated base portion 39 is turned in a counterclockwise direction from the position shown in Fig. 5 thereby connecting contact point 44 with conductive band 52. This is the "Off" position. In order to adjust the meter to zero, switches 46, 47 and 48 are all closed and resistor 41 is adjusted until the meter reads zero. Switches 46, 47 and 48 may be operated by the same shaft 50 which operates switching means 31. In order to calibrate the circuit, switch 31 is turned to the position shown in Fig. 5 where one terminal of the discharge device 22 is connected by means of conductor 23, contact point 51, band 52, and contact point 53, to the control electrode of tube 32. The current through this circuit may be traced from the positive terminal of potential source 30 through switch 48, over conductor 54 to the metal chamber and one terminal of discharge device 22, through the discharge device, over conductor 23 to points 51 and 53, through input resistor 36, to the negative terminal of potential source 30. This current is constant even though the potential source varies over a wide range and produces a constant voltage across resistor 36. The meter 37 is calibrated by adjusting resistor 42 so that the needle in the meter points to a predetermined value which is marked on the meter scale. The device is now ready to measure radiation.

To measure radiation the switch is turned in a clockwise direction so that point 51 is removed from contact with band 52 and contact point 55 makes contact with band 52 thereby connecting the smallest area on disc 14 with the control electrode in amplifier tube 32. At the same time the ground connection 44 remains on conductive band 56 as also do contact points 57 and 58 which are connected to the other two areas on disc 14. This switching arrangement presents the least sensitive connection to the ion chamber and only those ionizing currents which are in the vicinity of the small area will pass through the input resistor 36 to ground. During this measurement condition the maximum voltage is applied between the ion chamber case and the other two areas thereby maintaining an electric field between them. This electric field acts as a guard to the central area, defining its boundaries and making this measurement more accurate.

When the switch is turned so that both points 55 and 57 are in contact with band 52, the intermediate sensitivity of the chamber is achieved with the outer area acting as an electrostatic guard ring. By proper proportion of the areas the sensitivity may be in proportion of one to ten. The fifth position of the switch connects all three contact points 55, 57, and 58 to band 52 and the input resistor 36, thereby using the entire conductive area of disc 14 and obtaining the maximum sensitivity of the ion chamber.

Resistor 40 is not necessary for calibration of the meter or for its zero setting. It is added to drain battery 38 at a predetermined rate so that, as both batteries lose their electrical power, their change in voltage balance each other so far as the effects of the measuring circuit are concerned. When anode battery 30 loses some of its voltage, the anode-cathode current through tube 32 is reduced and the meter reading is reduced. But if battery 38 loses its voltage in a predetermined ratio, the bucking current through the meter and resistor 41 is also reduced, resulting in a meter reading which is accurate.

The invention has now been described in connection with one illustrative embodiment thereof. Obviously various changes could be made in the described structure without departing from the spirit of the invention or the scope of the accompanying claims. For example, although the plastic conductive liner has been described as preferably of phenol formaldehyde admixed with carbon, other plastic materials of low effective atomic number and admixed with carbon or other finely divided electrically conductive material could be employed. Examples of other suitable plastic materials are resinous condensation products of formaldehyde with urea or melamine.

We claim:

1. An ion chamber in combination with a current measuring circuit comprising: a sealed envelope containing a lining of conductive material, a central disc including a plurality of conducting areas each of which is connected to a lead-in conductor, a constant current component connected between the lining and a lead-in conductor, an external circuit which includes a dial switch connected to said lead-in conductors, an input resistor connected to the dial switch, and an amplifying system having an input circuit connected across said resistor and an output circuit connected to an indicating device.

2. An ion chamber in combination with a current measuring circuit comprising: a sealed metal envelope containing a lining of a conductive plastic, a central disc mounted separately from the lining and including a plurality of conducting areas, each of which is connected to a lead-in conductor, a constant current device connected between the metal envelope and a lead-in conductor, an external circuit which includes a dial switch connected to said lead-in conductors, an input resistor connected to the dial switch, and an amplifying system having an input circuit connected across said resistor and an output circuit connected to an indicating device.

3. An ion chamber in combination with a current measuring circuit comprising: a sealed metal envelope containing a lining of conductive plastic, a central disc mounted separately from the lining, said disc comprising a body of plastic material covered with a plurality of conductive coatings each of said coatings connected to a lead-in conductor, a constant current discharge diode connected between the metal envelope and a lead-in conductor, an external circuit which includes a dial switch connected to said lead-in conductors, an input resistor connected to said switch, and an amplifying system having an input circuit connected across said resistor and an output circuit connected to an indicating device.

4. An ion chamber in combination with a current measuring circuit comprising: a sealed envelope containing a lining of conductive material, a central disc including a plurality of conducting areas, each of which is connected to a lead-in conductor, a constant current discharged evice connected between the lining and a lead-in conductor, an external circuit which includes an amplifying system having an input circuit connected to an input resistor and an output circuit connected to an indicating device, and switching means for successively connecting the input resistor to said conducting areas and the lining.

5. An ion chamber in combination with a current measuring circuit comprising: a sealed envelope containing a lining of conductive plastic, a central disc mounted separately from the lining, said disc comprising a body of plastic material covered with a plurality of conductive coatings, each of said coatings connected to a lead-in conductor, a constant current gaseous discharge diode connected between the metal envelope and a lead-in conductor, an external circuit which includes an amplifying system having an input circuit connected to an input resistor and an output circuit connected to an indicating device, and switching means for successively connecting the input resistor to said conducting areas on the disc and the metal envelope.

6. An ion chamber in combination with a current measuring circuit as set forth in claim 5 wherein said switching means includes an arrangement which connects said discharge diode across the input resistor for calibrating the indicating device.

7. An ion chamber in combination with a current measuring circuit as set forth in claim 5 where the areas of two of said conductive coatings on the central disc are in the ratio of ten to one.

8. An ion chamber in combination with a current measuring circuit as set forth in claim 5 wherein said constant current diode includes a radioactive material for ionizing the gas in the diode.

9. An ion chamber in combination with a current measuring circuit as set forth in claim 8 wherein said constant current diode is protected by an envelope which is impervious to alpha rays, said envelope containing a vent.

10. An ion chamber in combination with a current measuring circuit comprising: a sealed aluminum envelope containing a lining of a conducting plastic containing finely divided carbon particles, a central disc mounted separately from the lining, said disc comprising a body of plastic insulating material covered with a plurality of conductive coatings, each of said coatings connected to a lead-in conductor, a constant current gaseous discharge diode connected between the aluminum envelope and a lead-in conductor, an external circuit which includes an amplifier tube having at least an anode, a cathode, and a control electrode, said external circuit having an input circuit connected to an input resistor and an output circuit connected to a current measuring device, and switching means for successively connecting the input resistor to each of the conductive coatings and to the constant current discharge device.

References Cited in the file of this patent

UNITED STATES PATENTS

| | | |
|---|---|---|
| 2,440,167 | Broxon et al. | Apr. 20, 1948 |
| 2,574,000 | Victoreen | Nov. 6, 1951 |
| 2,700,110 | Shamos | Jan. 18, 1955 |